(12) United States Patent
Zanassi

(10) Patent No.: US 12,071,061 B2
(45) Date of Patent: Aug. 27, 2024

(54) MODULAR CAGE TRAILER FOR THE TRANSPORT OF LIVESTOCK

(71) Applicant: PERFASIL S.A., Buenos Aires (AR)

(72) Inventor: Luis Alejandro Zanassi, Buenos Aires (AR)

(73) Assignee: PERFASIL S.A., Buenos Aires (AR)

( * ) Notice: Subject to any disclaimer, the term of this patent is extended or adjusted under 35 U.S.C. 154(b) by 961 days.

(21) Appl. No.: 17/024,163

(22) Filed: Sep. 17, 2020

(65) Prior Publication Data

US 2021/0086682 A1 Mar. 25, 2021

(51) Int. Cl.
| | | |
|---|---|---|
| B60P 3/04 | (2006.01) | |
| A01K 1/00 | (2006.01) | |
| A01K 1/02 | (2006.01) | |
| B62D 21/02 | (2006.01) | |
| B62D 33/04 | (2006.01) | |
| B62D 53/08 | (2006.01) | |

(52) U.S. Cl.
CPC .............. *B60P 3/04* (2013.01); *A01K 1/0035* (2013.01); *A01K 1/0245* (2013.01); *A01K 1/0272* (2013.01); *B62D 21/02* (2013.01); *B62D 33/04* (2013.01); *B62D 53/0842* (2013.01)

(58) Field of Classification Search
CPC ....... B60P 3/04; A01K 1/0035; A01K 1/0245; A01K 1/0272; B62D 21/02; B62D 33/04; B62D 53/0842; B62D 21/12; B62D 21/20
See application file for complete search history.

(56) References Cited

U.S. PATENT DOCUMENTS

| | | | | |
|---|---|---|---|---|
| 2,255,357 A | * | 9/1941 | Hawthorne | B60P 3/04 119/400 |
| 3,674,303 A | * | 7/1972 | Doonan | B60P 3/04 119/407 |
| 3,796,457 A | * | 3/1974 | Hinchliff | B62D 53/061 296/182.1 |
| 4,546,969 A | * | 10/1985 | Wilson | B60P 3/14 296/186.1 |
| 5,613,726 A | * | 3/1997 | Hobbs | B60P 3/04 52/630 |
| 9,463,759 B1 | * | 10/2016 | Kiefer | B60R 19/56 |
| 10,063,815 B1 | * | 8/2018 | Spivey | H04N 7/185 |
| 2010/0236490 A1 | * | 9/2010 | Sebastia | B60P 1/4421 119/407 |
| 2010/0300373 A1 | * | 12/2010 | Kell | B60P 3/04 119/512 |
| 2017/0267153 A1 | * | 9/2017 | Novero | B60P 3/04 |
| 2018/0035637 A1 | * | 2/2018 | Wilson | B65D 88/522 |
| 2020/0017013 A1 | * | 1/2020 | Records | B60P 3/1066 |
| 2020/0367473 A1 | * | 11/2020 | Purtle | A01K 31/002 |

* cited by examiner

*Primary Examiner* — Minnah L Seoh
*Assistant Examiner* — Marlon A Arce
(74) *Attorney, Agent, or Firm* — Lippes Mathias LLP

(57) ABSTRACT

A modular cage trailer which includes a semi-trailer over which there is a structure designed to transport livestock. The trailer includes a reticular lower chassis, side walls, a roof, a front wall and a rear wall, formed by cross-sectional elongated "L" profiles of different length, individually numbered, that are connected and assembled to each other through mounting plates and anchoring bolts that define the corresponding bridging knots, all of which are duly galvanized.

8 Claims, 11 Drawing Sheets

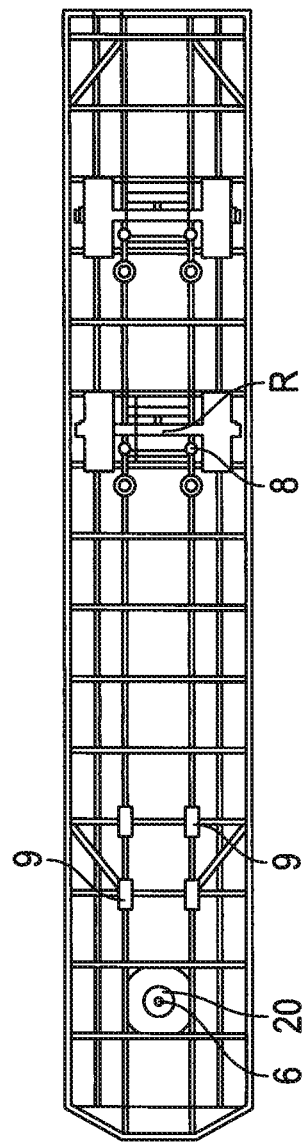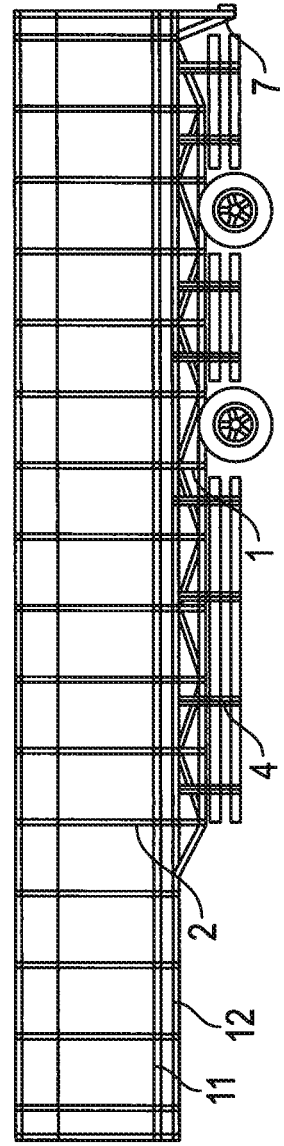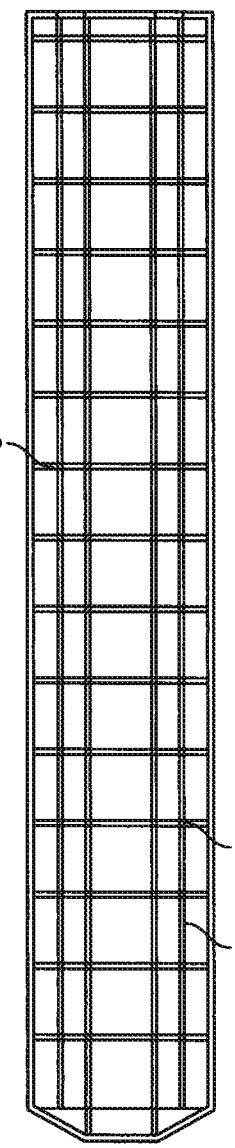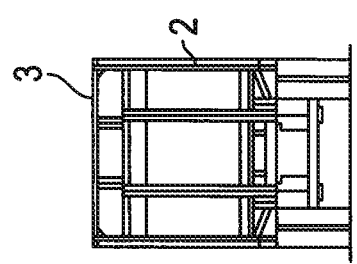

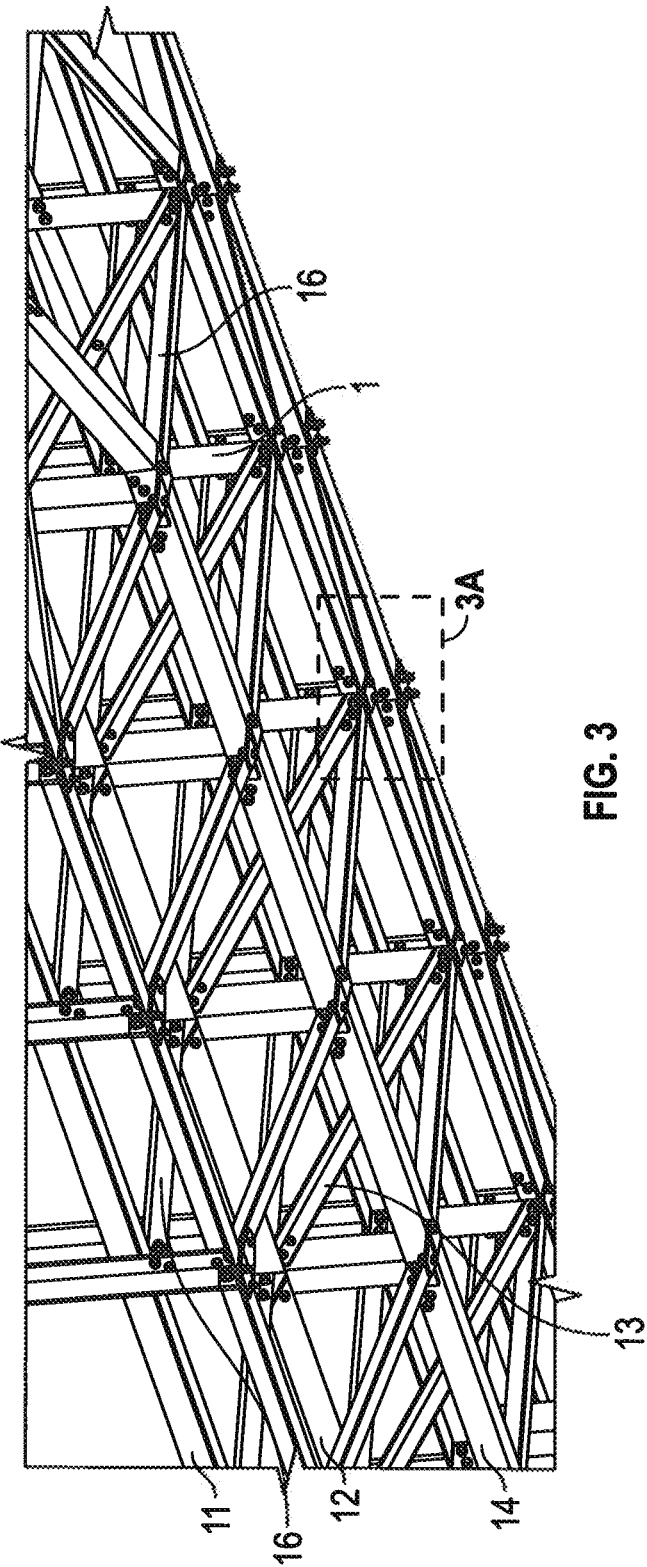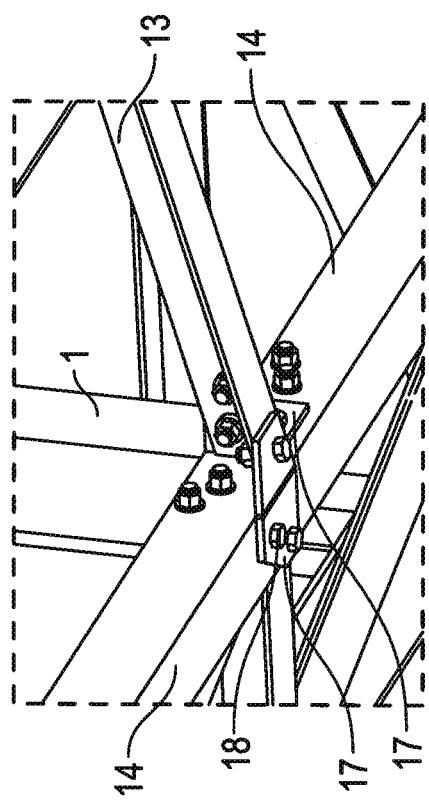
FIG. 3
FIG. 3A

MODULAR CAGE TRAILER FOR THE TRANSPORT OF LIVESTOCK

CLAIM OF PRIORITY

This application claims priority from Argentine patent application AR P190102668, dated Sep. 20, 2019, the entirety of which is hereby incorporated by reference.

BACKGROUND OF THE DISCLOSURE

The present disclosure mainly refers to a MODULAR CAGE TRAILER FOR THE TRANSPORT OF LIVESTOCK, which main characteristic is that its structure consists of angle profiles, joining plates and hot dip galvanized bolts.

Given the decrease in the railway system for the transport of livestock, the use of the vehicle transport is massively used when it refers to the transport of livestock in general.

Because of the particular characteristics shown for the transport of livestock by road, that includes bovine, sheep and pig livestock, the vehicles used are of a specific design, there being several transport companies exclusively committed to this activity.

Indeed, approximately 85% of the transports are made in vehicles for the sole use of the transport of livestock, with the remaining 15% for vehicles that are not for this sole use, being, in general, for the cereal transport.

The type of vehicles used for the transport of livestock are mostly single layer cage semi-trailers and, to a lesser extent, trucks with cage trailers. Two-floor cages are also known and are usually used for the transport of smaller animals such as pigs, sheep and calves.

All these vehicles are specifically designed for transporting live animals, and, consequently, they are open so that the animals receive the air directly, whilst the floor has to be barred so that the waste of the animals is not cumulated.

A common semi-trailer cage usually transports up to forty big animals and up to sixty small animals (calves and steers); a double-floor cage semi-trailer may transport up to one hundred and forty small animals.

Some antecedents related to cage semi-trailers for the transport of livestock have been disclosed, including the following:

The Argentine patent AR 001215B1 that discloses a tubular chassis for semitrailers, of the kind that is formed by tubular, elongated structures, parallel with each other and laterally arranged, connected with bottom crossbeams. It also has the characteristic of leaving wide side openings determined by columns that extend between beams; including an upper longitudinal section, above said openings, that has been planned to grant rigidity and resistance to the entire structure.

The Argentine publication AR 006581A1 is also cited. It refers to a patent application that shows a semi-trailer with a low height chassis and with a guided shaft, rotary in angles in the horizontal plane, of the type which chassis if formed as of a pair of beams, connected to each other through crossbeams, and which relies at its front end in a rotary plate arranged in the towing vehicle and in a pair of wheel spindles set over the rear section.

The Argentine publication AR 110121A1 is also cited. It discloses a patent application referred to a semi-trailer used for the transport of livestock. It includes a conventional chassis with a superstructure or bodywork of three floors, a first floor over the chassis and a second and third floor. The structure is made with iron of the structural pipe type, mechanically related to each other. The floors, lower part of the side panels and the floor of the bodywork are made of aluminum plates, mechanically related to the structure of iron pipes. On the first and second floors, the arrangement is divided into symmetrical sections by gates of the fence type of side opening.

The Argentine Industrial Model No. 58.367 of 1991, entitled Semitrailer, and the Argentine Industrial Model No. 63.248 of 1996, entitled Tubular Structure Applicable to Semitrailers are also mentioned as precedents.

Once the above-mentioned precedents have been analyzed, it is verified that none of them discloses a structural cage modularly shaped, much less shows the use of the angle profiles.

SUMMARY OF THE DISCLOSURE

More specifically, the present disclosure refers to a design of semi-trailer that includes a reticular chassis, walls and roof formed by numbered angle profiles that are connected and assembled to each other through grade bolts, duly sealed with a product that guarantees that the tightening torque is always maintained.

The main advantage of this structure is that, in case of any accident or another peculiarity, it is possible to replace the damaged parts without any difficulty just pointing at them, so that the vehicle can be quickly in a position to continue working.

Furthermore, the fact that the different sections that constitute the bodywork are formed by structures of elongated "L" profiles, confers this trailer a greater capacity of structural resistance with a lower tare weight, so it is possible to transport more load weight and also with a lower fuel consumption.

Furthermore, to assure sustainability, all the profiles and other intervening parts are duly galvanized so they have a protective layer that has been proven to be efficient. As is known, the hot dip galvanized iron or steel, has a useful life ranging from 20 to 50 years without evidencing rust.

As stated above, with the invented modular cage trailer, each galvanized part is protected both inside and outside, in sharp edges and in corners or areas of difficult access, acting as moisture barrier and also preventing the rust that is often generated due to the urine of the animals.

It refers to a disclosure that defines a new combination of means created to achieve a successful result, being unpredictable and surprising even for an expert in the matter.

Still other aspects of the disclosure will become apparent upon a ready and understanding of the following detailed description.

BRIEF DESCRIPTION OF THE DRAWINGS

In order to realize the advantages briefly outlined, to which the users and those skilled in the art may add many others, and to enable a better understanding of the constructive, constituent and functional characteristics of the cage trailer, a preferred embodiment is described below that is illustrated in a schematic manner and without a particular scale in the enclosed sheets, with the express clarification that, precisely, as it refers to an example, it does not merit to allocate a restrictive or exclusive character to the scope of protection of the present disclosure, but rather has a merely explanatory and illustrative intention of the basic concept thereof.

FIG. 1A is a bottom plan view of the trailer in accordance with a preferred embodiment of the disclosure.

FIG. 1B is a front elevational view of the trailer of FIG. 1A.

FIG. 1C is a side elevational view of the trailer of FIG. 1A.

FIG. 1D is a rear elevational view of the trailer of FIG. 1A.

FIG. 1E is a top plan view of the trailer of FIG. 1A.

FIG. 3 is an enlarged perspective view of the connection between the parts that form the reticular chassis of the trailer of the preferred embodiment.

FIG. 3A is an enlarged perspective view of the connection in FIG. 3.

DETAILED DESCRIPTION OF THE DISCLOSURE

Figure 2:
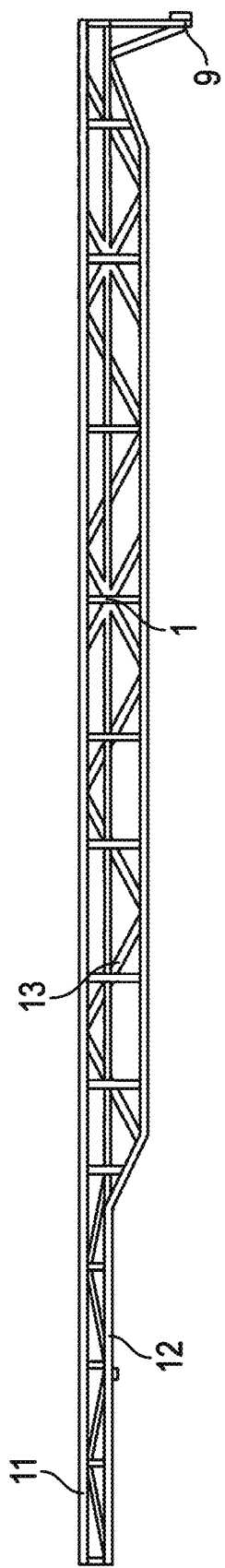
FIG. 2 is a side elevational view of the reticular chassis of the modular trailer of the preferred embodiment.

The modular cage trailer for the transport of livestock referred to herein overcomes deficiencies in existing trailers because both the chassis and the side, front and rear walls and the roof, are formed with a structure made of cross-sectional elongated "L" profiles.

In each case, structures that include studs and beams that are connected to a mounting inner chassis that consist of a special reticular structure that also uses diagonal bars assembled and connected using mounting plates and anchoring bolts that define the corresponding bridging knots are defined.

As stated above, all said elongated profiles, as well as the different plates used, are duly numbered, so that the replacement of any part, if necessary, is easy and direct.

It is also emphasized that all said parts are coated with a protective layer of galvanizing material, both internal and external, that acts as moisture and rust protection.

The cage trailer of the present disclosure uses a specific anchor plate for the mounting of its chassis over the running gear. A specific anchor plate foreseen for its support leg to the floor is also included. In both cases, they are fixed using the mentioned anchoring bolts with regards to productions that are easily dismantled to facilitate the replacement.

The same happens with the special mounting plate for the kingpin or locking pin that is coupled to the armature plate of the truck tractor, usually called fifth wheel.

The side studs and the roof are formed by "L" profiles that grant greater capacity of structural resistance to the entire structure since they connect the main chassis to the roof through the corresponding bridging knots formed by bolts and plates.

None of the existing cage trailers offer, or even suggest, the constructive solution that arises from what is stated in the foregoing paragraphs.

Specifically noting FIGS. 1A-1E, it can be appreciated that the modular cage trailer for the transport of livestock referred to herein, is formed by a set of cross-sectional modular "L" profiles, defining different sections related to each other to form a semitrailer cage.

The disclosure, in the first place, overcome deficiencies of the existing trailers because all the elongated "L" profiles are duly numbered, on the basis of which it is possible to know exactly where each of them is located, and so, if necessary, its replacement can be immediately performed.

As can be seen in FIGS. 1A-1E, the cage trailer of the disclosure includes one (1) and diagonal bars connected to each other by their end sections. The lower chassis is visible in FIG. 1C, and distinguished because in this case the referred "L" profiles form a reticular structure formed by beams, studs and diagonal bars.

FIG. 1A shows the lower face or floor of the mentioned chassis with its joining plates (8) to the running gear (R) over which it rests, as well as the corresponding plate (20) carrier of the "kingpin" (6) and the support leg (9).

Furthermore, FIG. 1B represents the front wall of the invented cage trailer that mainly consists of crossbeams (3) and studs (2) also formed by elongated "L" profiles.

Observing now FIG. 1C, the side walls of the cage trailer are formed by studs (2), the upper beam (10) and the pair of lower beams (11) and (12). Another set of "L" profiles that form the side device of underrun protection (4) may also be seen.

FIG. 1D represents the rear wall of the cage trailer of the disclosure where the presence of the loading and unloading door (5) can be seen, as well as the statutory bumper (7).

Finally, FIG. 1E illustrates how the roof of the cage trailer that combines the use of the mentioned beams (10) connected to the crossbeams (3) is formed, all of which are also elongated "L" profiles duly numbered in each of them.

Referring now to FIG. 2, the mentioned reticular structure that forms the chassis of the cage trailer can be observed, which is sideways formed by the studs (1), diagonal bars (13) and beams (11), (12) and (14).

In the detail represented in FIG. 3, it may be observed that the structure that defines the floor of the trailer uses the crossbeams (16) connected to the corresponding beams and studs.

FIG. 3A shows a bridging knot that connects the ends of a stud (1), a diagonal bar (13) and a beam (14), for which it uses the combination of two joining plates (17) and (17') that are fixed with the anchoring bolts (18), which shows that, if necessary, simply removing said bolts allows the removal of any of said duly numbered profiles and the replacement by another of equal characteristics.

Figure 4:
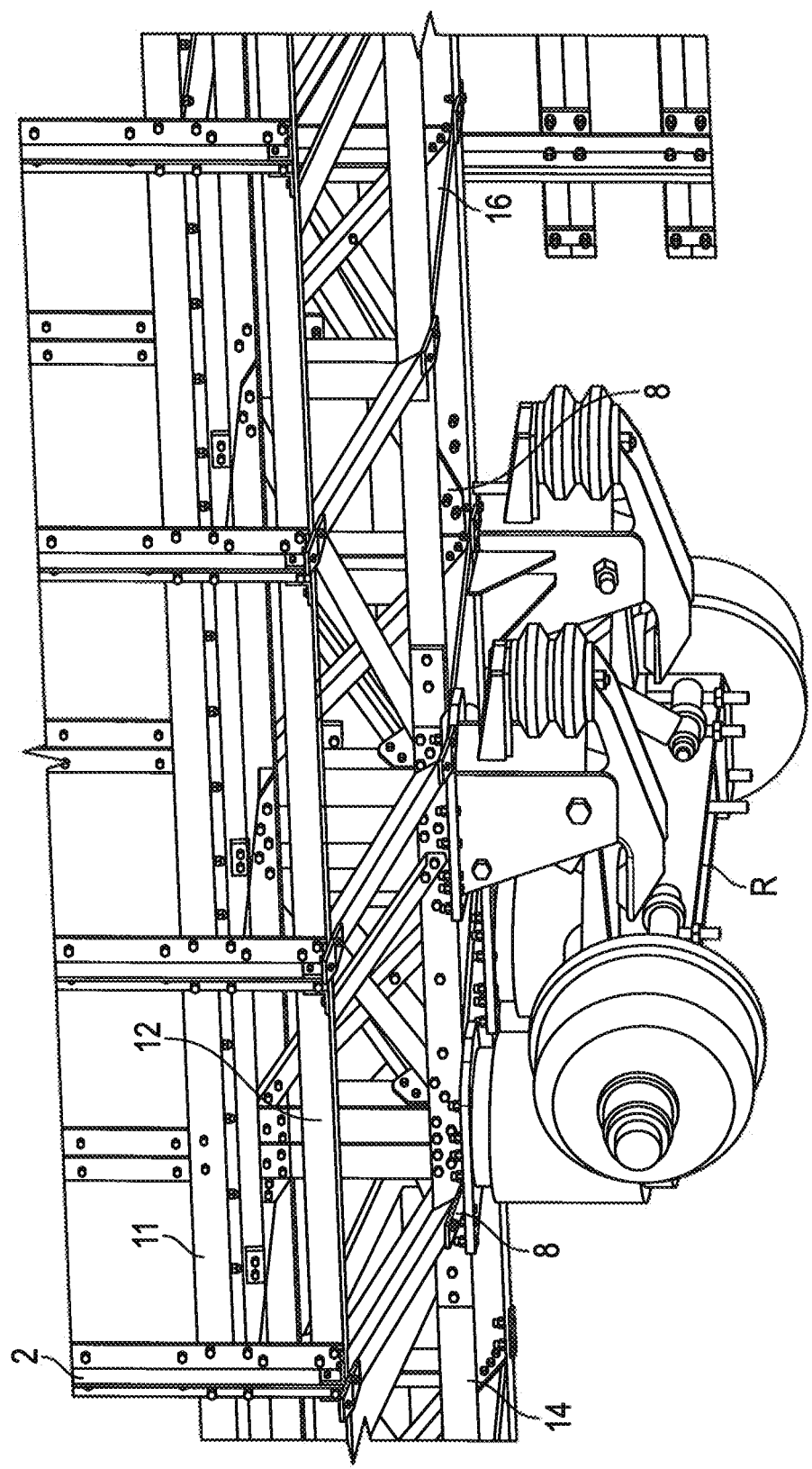
FIG. 4 is a perspective side view of a section of the chassis and its mounting on the running gear of the preferred embodiment.
Figure 5:
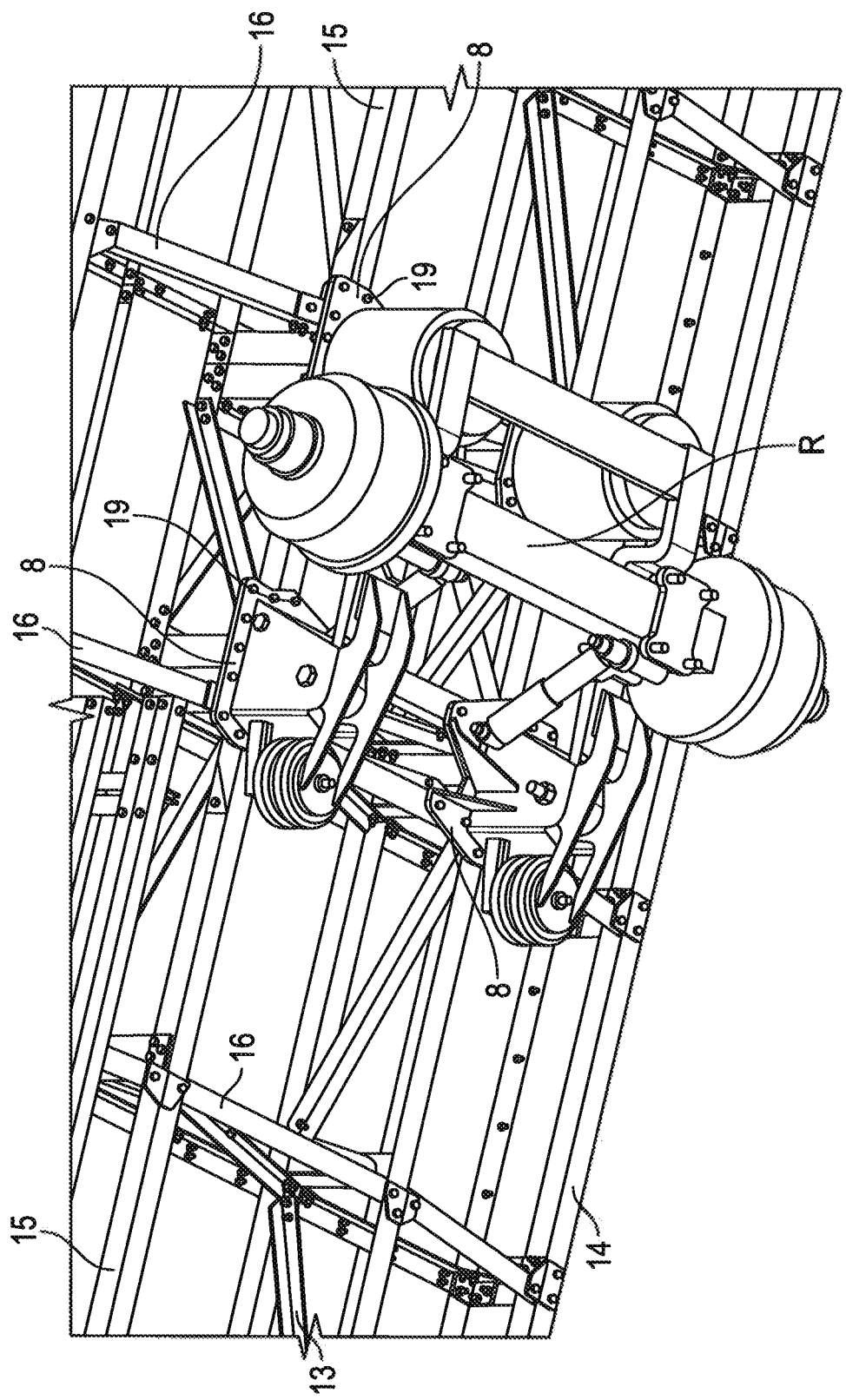
FIG. 5 is also an enlarged bottom perspective view of the floor that forms the lower chassis and its connection with the running gear of the preferred embodiment.

Referring now to FIGS. 4 and 5, it is possible to appreciate how the mounting of the chassis of the cage trailer over the running gear (R) is produced, for which it uses the joining plates (8) that are fixed over the encounter sector of a beam (15) and a crossbeam (16). The presence of four joining plates (8) arranged over the respective encounters of the beams and crossbeams of the chassis using the fixing bolts (19) can be appreciated.

Figure 6:
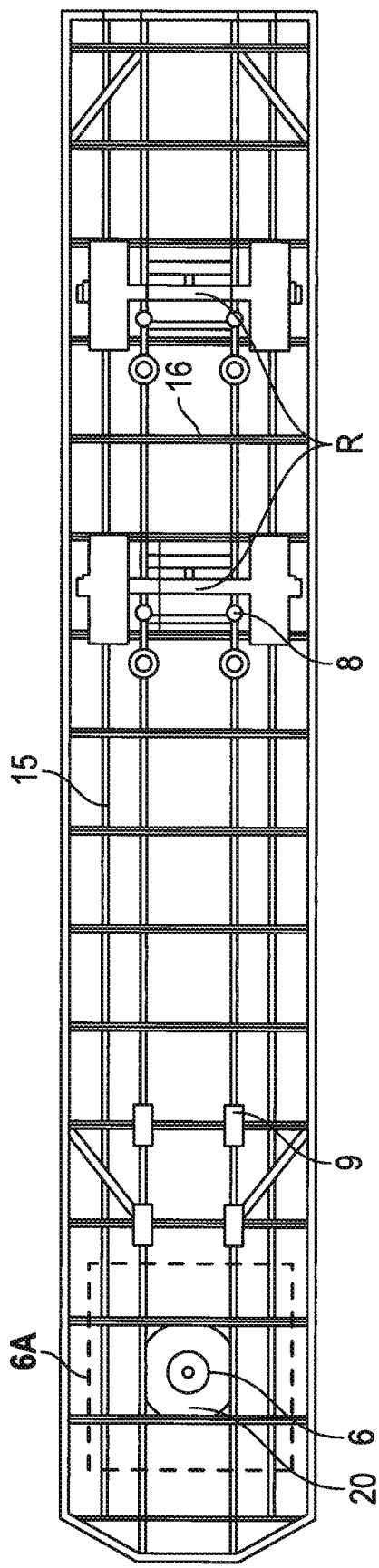
FIG. 6 is a bottom elevational view of the trailer of the preferred embodiment.
Figure 6A:
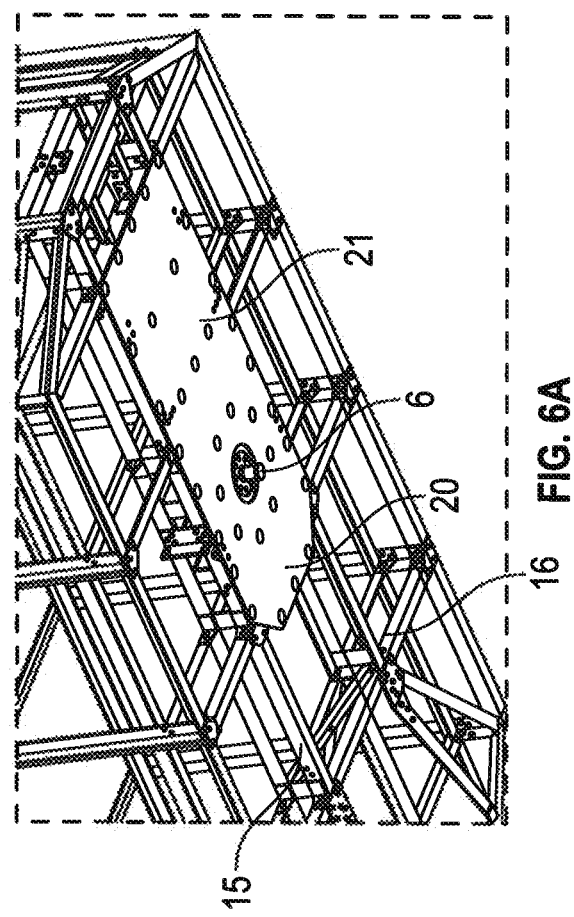
FIG. 6A is an enlarged perspective view that shows the connection in FIG. 6 with the anchor plate of the kingpin of the preferred embodiment.

Referring now to FIG. 6A, the anchor plate (20) carrier of the kingpin (6) that is fixed over combinations of crossbeams (16) and beams (15) also using anchoring bolts (21) can be appreciated.

Figure 7:
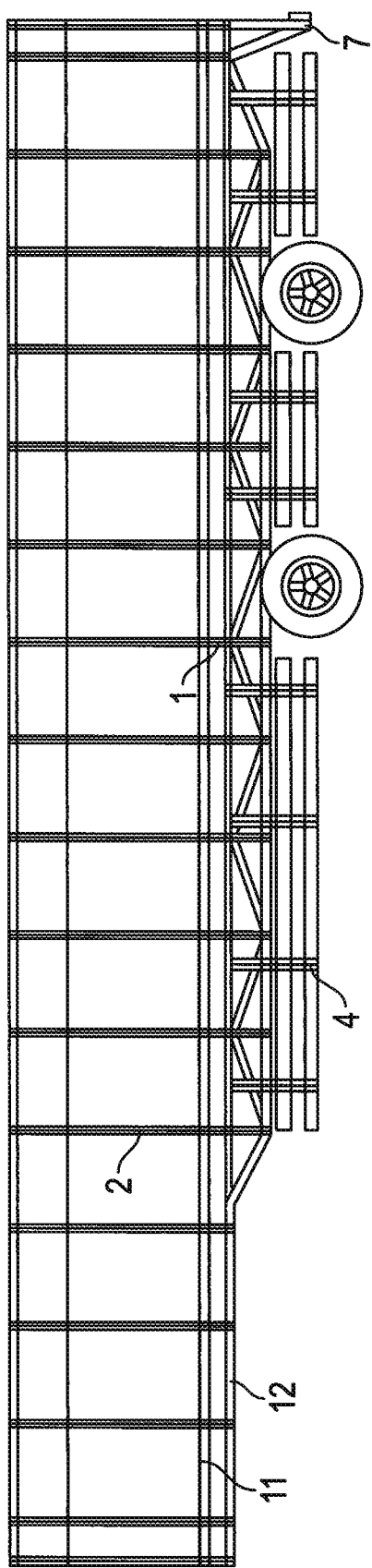
FIG. 7 is a right side elevational view of the trailer of the preferred embodiment.
Figure 8:
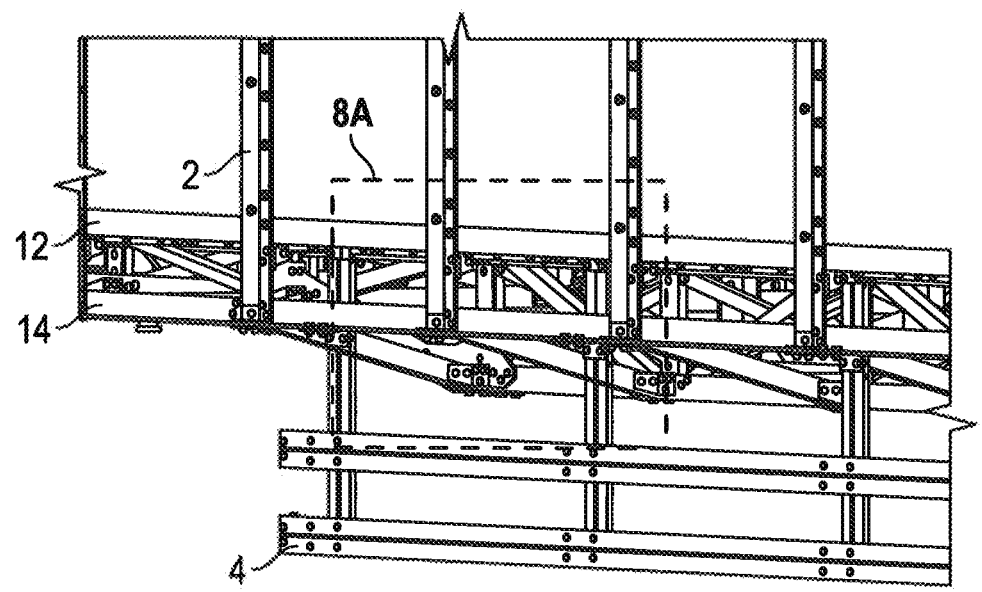
FIG. 8 is an enlarged perspective view of the connection of the side walls with the main chassis of the preferred embodiment.
Figure 8A:
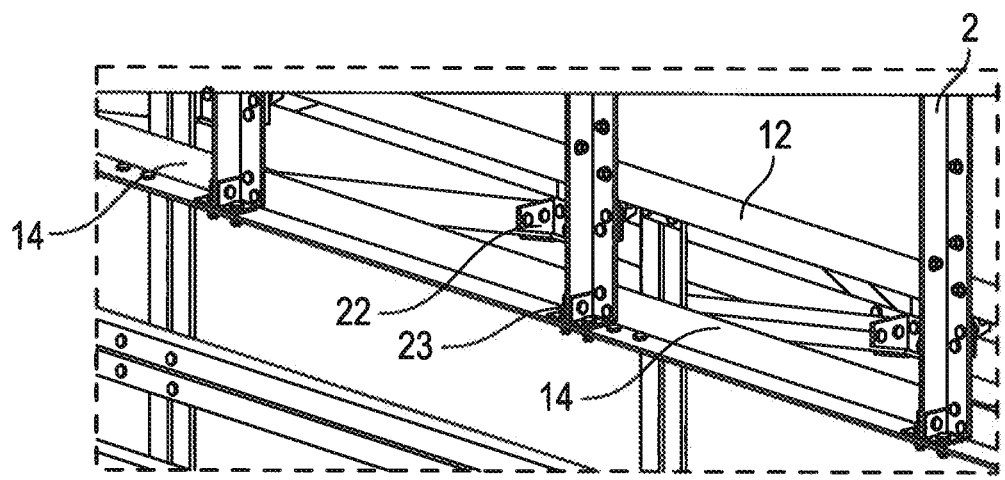
FIG. 8A is an enlarged perspective view of the connection of FIG. 8.

FIG. 7 and FIGS. 8 and 8A show how the mentioned studs (2) of the side walls are projected from the lower chassis, as well as the mounting of the side device underrun protection (4), all of which are also formed by elongated "L" profiles individually numbered, for which the corresponding joining plates (22) and anchoring bolts (23) are used.

Figure 9:
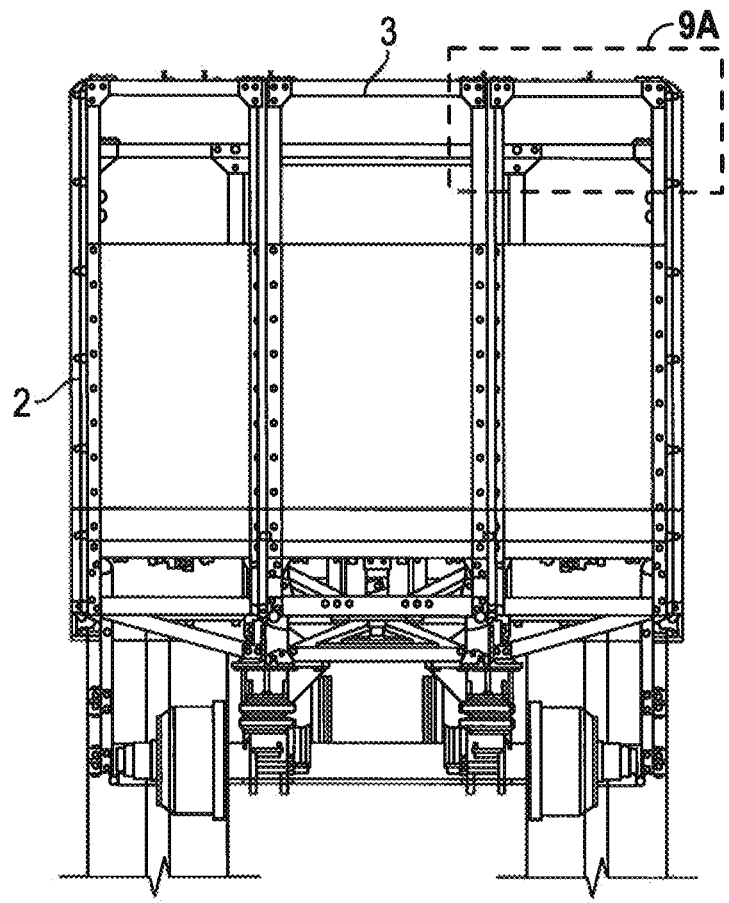
FIG. 9 is a front elevational view of the trailer of the preferred embodiment.
Figure 9A:
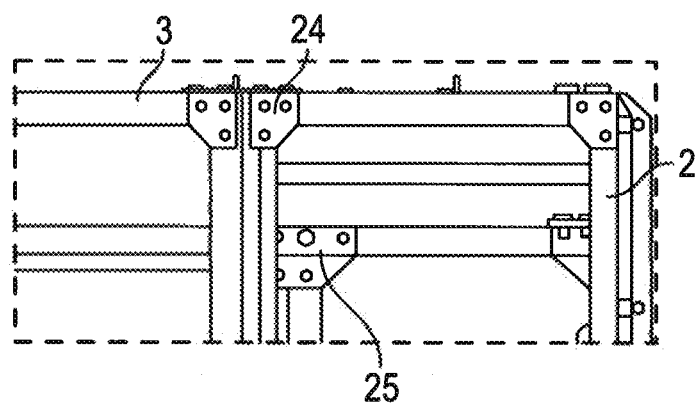
FIG. 9A is an enlarged front elevational view of an inside corner of the roof with the front wall of the trailer of FIG. 9 of the preferred embodiment.

FIGS. 9 and 9A show the connection of the upper crossbeams (3) with the studs of the front wall of the cage trailer of the present disclosure. It can be observed that, in this case, the joining plate (24) and the anchoring bolts (25) are used.

Figure 10:
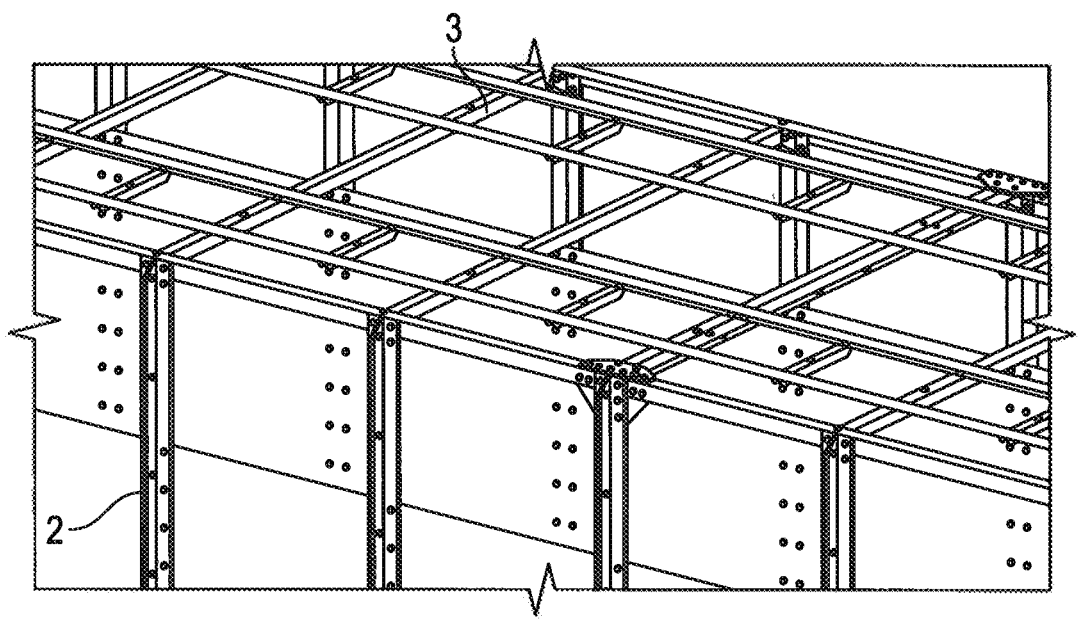
FIG. 10 is an enlarged perspective view of the structure that forms the roof of the trailer of the preferred embodiment.

Furthermore, FIG. 10 shows that it also uses a specific joining plate combined with anchoring bolts for the connection between the upper crossbeams of the roof (3) and the mentioned studs (2) of the side walls.

Figure 11:
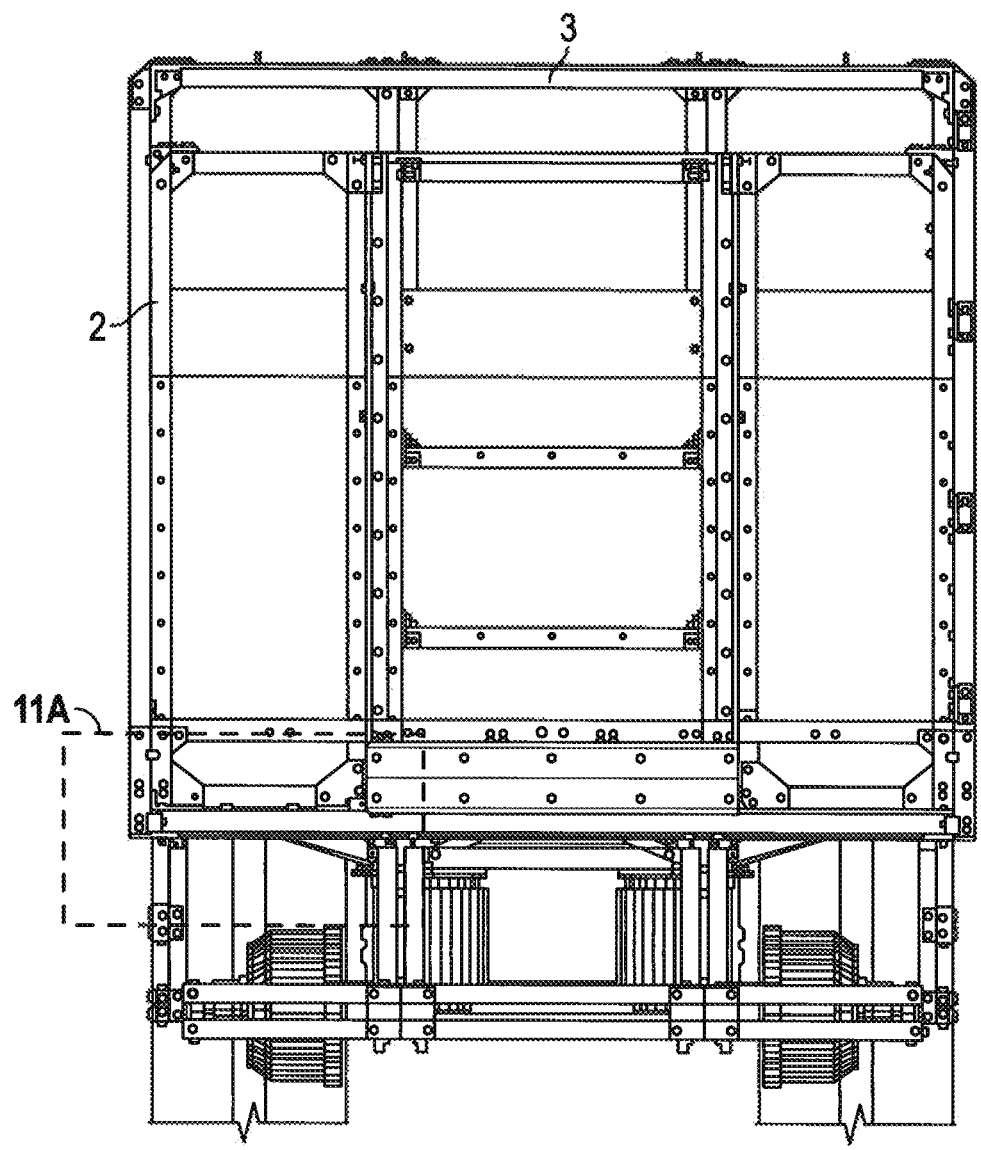
FIG. 11 is a rear elevational view of a lower section of the rear wall of the chassis of the trailer of the preferred embodiment.
Figure 11A:
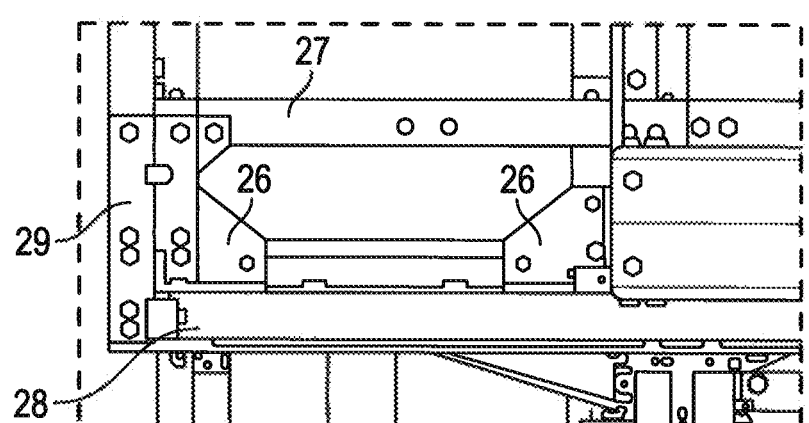
FIG. 11A is an enlarged rear elevational view of a lower section of the rear wall of the chassis of the trailer of FIG. 11 of the preferred embodiment.

Finally, FIGS. 11 and 11A also show the corner encounter of the rear wall of the cage trailer where it uses the joining plate (26) that connects a stud (2) with the rear crossbeams (27) and (28) and are fixed through the anchoring bolts (29).

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

Having described and exemplified the nature and main purpose of the present disclosure, as well as how it can be implemented, the following is claimed as exclusive property and rights.

The invention claimed is:

1. A modular cage trailer for the transport of livestock, including a semi-trailer over which there is a structure configured to transport livestock, comprising: a reticular lower chassis, side walls, a roof, a front wall and a rear wall, each formed by a plurality of modular assemblies each comprising a plurality of cross-sectional elongated L-shaped members of different length, each of which is individually numbered to be readily identified and configured to be assembled and reassembled, that are connected and assembled to each other through bridging knots comprising one or more mounting plates and anchoring bolts configured to facilitate removal of one of said modular assemblies by removal of said anchoring bolts; wherein said L-shaped members are galvanized.

2. The modular cage trailer for the transport of livestock, according to claim 1, wherein the lower chassis includes a set of said L-shaped members of different length that form a reticular structure formed by beams, studs and diagonal bars.

3. The modular cage trailer for the transport of livestock, according to claim 1, wherein the lower chassis includes a mounting plate of running gear that is arranged over longitudinal L-shaped members and said cross-sectional L-shaped members and is fixed through bolts.

4. The modular cage trailer for the transport of livestock, according to claim 1, wherein the lower chassis supports a plate carrier of a "kingpin" that is arranged fixed with bolts over said individually numbered L-shaped members.

5. The modular cage trailer for the transport of livestock, according to claim 1, wherein the front wall of the cage trailer is formed by numbered crossbeams and studs of different length, formed by elongated L-shaped members.

6. The modular cage trailer for the transport of livestock, according to claim 1, wherein the side walls of the trailer are made of studs, upper beams and lower beams of different length, individually numbered, all of which are formed by L-shaped members.

7. The modular cage trailer for the transport of livestock, according to claim 1, wherein a set of individually numbered L-shaped members of different length, form a side device of underrun protection.

8. The modular cage trailer for the transport of livestock, according to claim 1, wherein the rear wall of the cage trailer includes a loading and unloading door and a statutory bumper defined over said L-shaped members arranged over mounting plates fixed with bolts.

* * * * *